United States Patent [19]

Wittman, III

[11] 4,424,237

[45] Jan. 3, 1984

[54] HYDRATED EMULSIFIER FOR USE IN FLOUR BASED BAKED GOODS

[75] Inventor: James S. Wittman, III, Rockton, Ill.

[73] Assignee: Batter-Lite Foods, Inc., Beloit, Wis.

[21] Appl. No.: 360,472

[22] Filed: Mar. 22, 1982

[51] Int. Cl.$^3$ .......................... A21D 2/16; A23D 5/00

[52] U.S. Cl. .................................... 426/653; 426/654; 426/552; 252/356

[58] Field of Search ................. 426/653, 654; 252/356

[56] References Cited

U.S. PATENT DOCUMENTS

| | | | |
|---|---|---|---|
| 3,144,339 | 8/1964 | Dalby et al. ..................... | 426/654 X |
| 3,227,559 | 1/1966 | Radlove ........................... | 426/654 X |
| 3,248,229 | 4/1966 | Pader et al. ..................... | 426/653 X |
| 3,310,408 | 3/1967 | Hansen ............................ | 426/654 X |
| 3,494,771 | 2/1970 | Thompson ....................... | 426/653 X |
| 4,242,366 | 12/1980 | Morgan et al. ................. | 426/653 X |
| 4,339,465 | 7/1982 | Strouss ............................ | 426/653 X |

FOREIGN PATENT DOCUMENTS

| | | | |
|---|---|---|---|
| 1934124 | 1/1971 | Fed. Rep. of Germany ...... | 426/654 |
| 53-121971 | 10/1978 | Japan .................................... | 426/654 |
| 1002445 | 8/1965 | United Kingdom ................ | 426/654 |

*Primary Examiner*—Robert A. Yoncoskie
*Attorney, Agent, or Firm*—Gerald A. Mathews

[57] ABSTRACT

There is disclosed hydrated emulsifier comprising stearyl monoglyceridyl citrate, propylene glycol monostearate, lactated monoglycerides and water. The non-aqueous ingredients are heated together and melted. A gum, such as xanthan gum, may be added. Hot water is admixed, and the solution is passed through a homogenizer. The resulting solution is cooled to room temperature. The emulsion product may be in semi-solid or solid form. The hydrated emulsifier can be used as a partial or complete replacement for shortening in flour based baked goods.

11 Claims, No Drawings

HYDRATED EMULSIFIER FOR USE IN FLOUR BASED BAKED GOODS

BACKGROUND OF THE INVENTION

This invention relates to emulsifiers and, more particularly, to hydrated emulsifiers for use in preparing foods. It is especially useful in preparing baked products such as low calorie, fat free dietetic cakes.

Normally, flour based baked confectionary products, such as cakes, cookies, muffins and rolls, comprise flour, a sweetener and shortening. All of these ingredients have calories which are the bane of diet and weight conscious people everywhere. Further, fats are generally undesirable to those seeking a low cholesterol diet. However, heretofore, none of these primary ingredients could be omitted from these products because they were all needed in combination to produce an acceptably sweet product having the desired volume, texture, taste, mouthfeel and moisture.

The problems associated with omitting any of these main ingredients are complex and varied because of the many interrelationships pertaining to taste, texture, feel and appearance which change unexpectedly and unpredictably in their absence, or even when their relative proportions and forms are changed. If the sweetener is omitted, the product will not be sweet. If the flour is omitted, the product will not have acceptable texture, appearance and mouth-feel. If the shortening is omitted, the product will be dry, have a tough bread-like consistency, and the other ingredients will not be dispersed and combined uniformly. Such dispersion of ingredients and tenderizing of the flour is absolutely essential in flour based baked confectionary products, and the primary reason why shortening heretofore had to be included was to shorten (tenderize) the flour and to uniformly disperse the ingredients to produce a product which was better than a mere agglomeration of its parts.

SUMMARY OF THE INVENTION

The problems inherent with the calories associated with the presence of shortening in general, and fat in particular, in cake mixes, especially dietetic cake mixes and related products, have been obviated with this invention. A hydrated emulsifier is provided which is comprised of very small particles (i.e. about 1–4 microns) that utilize water to disperse and hold the other ingredients uniformly througout a cake. The hydrated emulsifier particles attract and hold water and the other ingredients to the flour particles so efficiently that a cake baked from the resulting mixture attains the desired consistency, texture, taste, moisture and mouth-feel without the need of shortening, so the cake can be made with no fat and has concomitantly fewer calories.

Essentially, the hydrated emulsifier operates as a substitute for a fat commonly supplied in a shortening to tenderize the flour particles and to bind them to the other ingredients. Since this hydrated emulsifier has this unusual characteristic, and to such a great degree, it can be used to incorporate a greater quantity of ingredients, such as air and water, that are already present in cakes, as well as to include ingredients, such as cellulose, which usually are not found in cakes, but which may be desirable in dietetic cakes because they contain fewer calories than other, common ingredients. The net result is a product that is light, moist, cake-like in texture, appearance and mouth-feel, but has considerably fewer calories, such as from about 25% to about 45% fewer.

The emulsifier readily combines with any kind of sweetener, whether in liquid or crystalline form. Its component particles are microscopically sized to facilitate rapid combination with the ingredients and promote complete dispersion of the mixture. In some embodiments, a gum is included to function as a kind of starch and to increase the amount of water the emulsifier can assimilate and hold in the mixture. The more noncaloric ingredients the emulsifier can hold together, such as water, air and cellulose, the fewer calories will be in a given portion of the final product.

Accordingly, it is an object of this invention to provide a hydrated emulsifier for use as a partial or complete replacement for shortening in flour based baked products.

Another object of this invention is to provide a fat free hydrated emulsifier.

It is another object to provide a hydrated emulsifier which is comprised of micron-sized particles.

Still another object is to provide a hydrated emulsifier which functions to provide a molecular dispersion of its particles for combination with other ingredients in a flour based baked product.

Another object is to provide a hydrated emulsifier which can assimilate non-nutritive ingredients into a flour based baked product.

Yet another object is to provide a hydrated emulsifier for use in a cake mix which permits a reduction in sugar, milk and egg content by up to 50%, and a reduction in calories by up to about 40%.

Still another object is to provide a hydrated emulsifier which permits the reduction of batter solids for a cake by up to about 10%.

A feature and advantage of this invention is that the hydrated emulsifier can be used to produce a cake which is completely free of shortening and fat.

These and other objects, features and advantages of the invention will become apparent to those skilled in the art when the following description of the preferred embodiments are read and understood.

DESCRIPTION OF THE PREFERRED EMBODIMENTS

The emulsifier is essentially comprised of stearyl monoglyceridyl citrate (SMGC), propylene glycol monostearate (PGMS), lactated monoglycerides (i.e. Durlac 100) and water. Some embodiments include one or more of the following: non-fat dry milk, lactose or a gum, such as xanthan gum.

The proportions of the ingredients and preparation of the emulsifier is set forth in the following illustrative examples. In all of the examples, the mixed ingredients of the emulsifier were passed through a Gaulin two stage homogenizer with the first stage pressure valve set at 1800 psig and the second stage pressure valve set at 700 psig for a total pressure differential of 2500 psig. This produces a fine, aqueous dispersion. In all of the examples, the initial product from the homogenizer was recycled through the homogenizer to ensure a more uniform product.

In these examples, the weights of the emulsifier ingredients are expressed in terms of both pounds and percent of total weight. The particle size was determined by observing the emulsifier solution on a slide under a microscope and measuring their diameters in microns.

The specific gravity of the batter, and the weight loss (moisture) and emulsifier activity in the cakes were determined by baking a cake from a standard test mix utilizing a different emulsifier example in each cake.

The formula for the dry mix of the standard cake is as follows:

| Standard Dry Cake Mix | |
|---|---|
| Ingredient | Percent Proportion by Weight |
| Cake flour | 51.2 |
| Crystalline fructose | 39.9 |
| Dried egg white | 1.1 |
| Glucono delta lactone | 2.0 |
| Baking soda | 1.0 |
| Nonfat dry milk | 4.5 |
| Flavor | 0.3 |
| | 100.0% |

This dry cake mix was combined with the following ingredients, in the indicated proportions, to produce the cake batter in Examples 1–7:

| Ingredient | Weight | Proportion |
|---|---|---|
| Test cake mix | 220.7 g | 58.96% |
| Hydrated emulsifier | 29.2 g | 7.80% |
| Water | 124.4 g | 33.24% |
| | 374.3 g | 100.00% |

In Examples 8–10, the proportions of the test mix, hydrated emulsifier, water and gum for the cake were varied as indicated in the particular examples and the Sp.G., percent moisture loss and emulsifier activity were noted for each combination of ingredients.

In addition, in those Examples 1–10 wherein the hydrated emulsifier did not contain a gum, xanthan gum, in the amount of 0.55 g was added to the cake mix. The ingredients were mixed for one minute at low speed to obtain uniform wetting and consistency. The batter was then beaten at high speed, such as speed 6 on a Sunbeam Mixmaster. Specific gravity was then measured and the mixture was poured into an 8" diameter cake pan and baked for 25 minutes in an oven preheated to 350° F.

HYDRATED EMULSIFIER EXAMPLES

EXAMPLE 1

| | Emulsifier Composition | | | | Baked Cake | |
|---|---|---|---|---|---|---|
| | Weight | | Particle Size (dia- | Cake Batter | Weight Loss During Baking (% | Emulsifier Activ- |
| Ingredients | Lbs. | % | microns) | Sp. G. | moisture) | ity |
| SMGC | 1.44 | 4.06 | | | | |
| PGMS | 2.81 | 7.92 | 1–2 | 0.96 | 9.4 | fully active |
| Lactated Monoglycerides | 2.81 | 7.92 | | | | |
| Water | 28.40 | 80.09 | | | | |
| | 35.46 | 100.0 | | | | |

PREPARATION, RESULTS AND COMMENTS

Ingredients heated together on a steam bath at 180 degrees F. with hand mixing. The initial product was recycled in the homogenizer. It had a milky appearance with little foam and solidified upon cooling. A stable emulsion was produced.

EXAMPLE 2

| | Emulsifier Composition | | | | Baked Cake | |
|---|---|---|---|---|---|---|
| | Weight | | Particle Size (dia- | Cake Batter | Weight Loss During Baking (% | Emulsifier Activ- |
| Ingredients | Lbs. | % | microns) | Sp. G. | moisture) | ity |
| SMGC | 1.44 | 3.98 | 2–4 | 0.75 | 9.5 | Fully Active |
| PGMS | 2.81 | 7.77 | | | | |
| Lactated Monoglycerides | 2.81 | 7.77 | | | | |
| Xanthan gum | 0.69 | 1.91 | | | | |
| Water | 28.4 | 78.56 | | | | |
| | 36.15 | 100.0 | | After four freeze/thaw cycles | | |
| | | | | 0.73 | 10.1 | Fully active |

PREPARATION, RESULTS AND COMMENTS

The SMGC, PGMS, lactated monoglycerides and xanthan gum were heated together on a steam bath at 140 degrees F. After the SMGC, PGMS and lactated monoglycerides had melted (xanthan gum does not melt), hot (140 degrees F.) water was added and the mixture was stirred by hand until it was uniform in appearance. The initial product was recycled through the homogenizer. The resulting product had a pudding-like consistency which did not solidify on cooling. The emulsion was stable through repeated freeze/thaw cycles.

EXAMPLE 3

| | Emulsifier Composition | | | | Baked Cake | |
|---|---|---|---|---|---|---|
| | Weight | | Particle Size (dia- | Cake Batter | Weight Loss During Baking (% | Emulsifier Activ- |
| Ingredients | Lbs. | % | microns) | Sp. G. | moisture) | ity |
| SMGC | 1.44 | 3.70 | | | | |
| PGMS | 2.81 | 7.21 | 1–2 | 0.75 | 6.2 | Fully active |
| Lactated Monoglycerides | 2.81 | 7.21 | | | | |
| Nonfat dry milk | 3.50 | 8.98 | | | | |
| Water | 28.40 | 72.90 | | | | |
| | 38.96 | 100.00 | | | | |

PREPARATION, RESULTS AND COMMENTS

The SMGC, PGMS, lactated monoglycerides, and nonfat dry milk were heated on a steam bath at 150 degrees F. After the SMGC, PGMS and lactated monoglycerides had melted, hot (140 degrees F.) water was added and continuous hand stirring was used to maintain a uniform mixture. The initial product was recycled through the homogenizer. The final product had a milky appearance with a lot of foam and solidified upon cooling. A stable emulsion was produced.

EXAMPLE 4

| | Emulsifier Composition | | | | Baked Cake | |
|---|---|---|---|---|---|---|
| Ingredients | Weight Lbs. | % | Particle Size (dia-microns) | Cake Batter Sp. G. | Weight Loss During Baking (% moisture) | Emulsifier Activity |
| SMGC | 1.44 | 3.80 | 2–4 | 0.74 | 9.0 | Fully Active |
| PGMS | 2.81 | 7.41 | | | | |
| Lactated Mono-glycerides | 2.81 | 7.41 | | | | |
| Lactose | 1.75 | 4.62 | | | | |
| Xanthan gum | 0.69 | 1.82 | | | | |
| Water | 28.40 | 74.93 | | | | |
| | 37.9 | 100.00 | | | | |

PREPARATION, RESULTS AND COMMENTS

The SMGC, PGMS, lactated monoglycerides, lactose and xanthan gum were heated on a steam bath at 140 degrees F. After the SMGC, PGMS and lactated monoglycerides had melted, the lactose and xanthan gum were dispersed with hand mixing and hot (140 degrees F.) water was added. Hand mixing produced a uniform appearance which was 140 degrees F. before homogenization. The initial product was recycled through the homogenizer and the final product had a thick, pudding-like consistency which did not solidify upon cooling. A stable emulsion was produced.

EXAMPLE 5

| | Emulsifier Composition | | | | Baked Cake | |
|---|---|---|---|---|---|---|
| Ingredients | Weight Lbs. | % | Particle Size (dia-microns) | Cake Batter Sp. G. | Weight Loss During Baking (% moisture) | Emulsifier Activity |
| SMGC | 1.44 | 3.63 | 2–4 | 0.75 | 9.2 | Fully Active |
| PGMS | 2.81 | 7.09 | | | | |
| Lactated Mono-glycerides | 2.81 | 7.09 | | | | |
| Xanthan gum | 0.69 | 1.74 | | | | |
| Nonfat dry milk | 3.50 | 8.83 | | | | |
| Water | 28.40 | 71.63 | | | | |
| | 39.65 | 100.00 | | | | |

PREPARATION, RESULTS AND COMMENTS

The SMGC, PGMS, lactated monoglycerides were heated on a steam bath at 140 degrees F. until fully molten. The xanthan gum and nonfat dry milk were added and dispersed with hand stirring. Hot water was added and the mixture was stirred. The temperature of the resulting mixture was 130 degrees F. and a uniform appearance could not be obtained by stirring. Raising the temperature to 140 degrees F. with continuous stirring resulted in uniform appearance. The initial product was recycled. The final product has a thick, pudding-like consistency (thicker than the product in examples 2 and 4) which did not solidify on cooling. A stable emulsion was produced.

EXAMPLE 6

| | Emulsifier Composition | | | | Baked Cake | |
|---|---|---|---|---|---|---|
| Ingredients | Weight Lbs. | % | Particle Size (dia-microns) | Cake Batter Sp. G. | Weight Loss During Baking (% moisture) | Emulsifier Activity |
| SMGC | 9.9 | 3.96 | 2–4 | 0.77 | 9.6 | Fully Active |
| PGMS | 19.4 | 7.76 | | | | |
| | | | | After one freeze/thaw cycle | | |
| Lactated Mono-glycerides | 19.4 | 7.76 | | 0.68 | 9.5 | Fully active |
| Xanthan gum | 4.8 | 1.92 | | After two freeze/thaw cycles | | |
| Potassium Sorbate | 1.0 | 0.40 | | 0.74 | 11.0 | Fully active |
| | | | | After three freeze/thaw cycles | | |
| Water | 195.5 | 78.20 | | 0.84 | 9.1 | Fully active |
| | 250.0 | 100.00 | | | | |

PREPARATION, RESULTS AND COMMENTS

The SMGC, PGMS and lactated monoglycerides were heated together on a steam bath at 140 degrees F. The xanthan gum and potassium sorbate were added and dispersed. Water at 130 degrees F. was added and the mixture was stirred by hand until it was uniform in appearance with the temperature at 140 degrees F. The initial product was recycled and the final product had a thick pudding-like consistency which did not solidify on cooling. A stable emulsion was produced which remained stable after three freeze/thaw cycles.

EXAMPLE 7

| | Emulsifier Composition | | | | Baked Cake | |
|---|---|---|---|---|---|---|
| Ingredients | Weight Lbs. | % | Particle Size (dia-microns) | Cake Batter Sp. G. | Weight Loss During Baking (% moisture) | Emulsifier Activity |
| SMGC | 9.9 | 3.96 | 2–4 | 0.73 | 10.1 | Fully Active |
| PGMS | 19.4 | 7.76 | | | | |
| | | | | After one freeze/thaw cycle | | |
| Lactated Mono-glycerides | 19.4 | 7.76 | | 0.71 | 8.7 | Fully active |
| Xanthan gum | 4.8 | 1.92 | | After two freeze/thaw cycles | | |
| Potassium Sorbate | 1.0 | 0.40 | | 0.84 | 12.3 | Fully Active |
| Water | 195.5 | 78.20 | | | | |
| | 250.0 | 100.00 | | | | |

PREPARATION, RESULTS AND COMMENTS

The SMGC, PGMS and lactated monoglycerides were heated together on a steam bath at 140 degrees F. The xanthan gum and potassium sorbate were added and dispersed. Water at 130 degrees F. was added and the mixture was stirred by hand until it was uniform in appearance with the temperature at 140 degrees F. The initial product was recycled and the final product had a thick, pudding-like consistency which did not solidify on cooling. A stable emulsion was produced which remained stable after two freeze thaw cycles.

EXAMPLE 8

| | Emulsifier Composition | | | Baked Cake | |
|---|---|---|---|---|---|
| | Weight | | Particle Size (dia- | Cake Batter | Weight Loss During Baking (% mois- | Emulsi- fier Activ- |
| Ingredients | Lbs. | % | microns) | Sp. G. | ture) | ity |
| SMGC | 0.90 | 2.25 | Less than 1 | 0.80* | 10.2 | Fully Active |
| PGMS | 1.73 | 4.33 | | | | |
| Lactated Mono- glycerides | 1.73 | 4.33 | | 0.90** | 9.1 | Fully Active |
| Potassium Sorbate | 0.21 | 0.53 | | 0.89*** | 9.4 | Par- tially Active |
| Water | 35.42 | 88.57 | | 0.83**** | 8.7 | Par- tially Active |
| | 39.99 | 100.00 | | | | |

PREPARATION, RESULTS AND COMMENTS

The SMGC, PGMS and lactated monoglycerides were heated on a steam bath until fully molten. The temperature was 145 degrees F. Potassium sorbate was added and dispersed with hand stirring. Hot water was added and the mixture was stirred to achieve a uniform appearance. The final temperature was 140 degrees F. The initial product was recycled in the homogenizer. The final product had a milky appearance and solidified on cooling. A stable emulsion was produced which remained stable through several freeze/thaw cycles.

| Ingredients* | Wt. | Ingredients** | Wt. |
|---|---|---|---|
| Test Cake Mix | 220.7 g | Test Cake Mix | 220.7 g |
| Emulsifier | 29.2 g. | Emulsifier | 14.6 g |
| Water | 124.4 g | Water | 124.4 g |
| Gum | 0.55 g | Gum | 0.55 g |
| | 374.85 g | | 360.25 g |

| Ingredients*** | Wt. | Ingredients**** | Wt. |
|---|---|---|---|
| Test Cake Mix | 220.7 g | Test cake mix | 220.7 g |
| Emulsifier | 7.0 g | Emulsifier | 7.0 g |
| Water | 124.4 g | Water | 139.0 g |
| Gum | 0.55 g | Gum | 0.55 g |
| | 352.65 g | | 367.25 g |
| Comment: | shiny top, chewy texture | Comment: Chewy texture | |

EXAMPLE 9

| | Emulsifier Composition | | | Baked Cake | |
|---|---|---|---|---|---|
| | Weight | | Particle Size (dia- | Cake Batter | Weight Loss During Baking (% mois- | Emulsi- fier Activ- |
| Ingredients | Lbs. | % | microns) | Sp. G. | ture) | ity |
| SMGC | 1.62 | 4.05 | | 0.81* | 8.5 | Fully Active |
| PGMS | 3.18 | 7.95 | | | | |
| Lactated Mono- glycerides | 3.18 | 7.95 | 95% less than 1, | 0.85** | 9.6 | Fully Active |
| Potassium Sorbate | 0.21 | 0.52 | 5% 1-2 | 0.94*** | 9.9 | Par- tially Active |
| Water | 31.83 | 79.54 | | | | |
| | 40.02 | 100.00 | | 0.92**** | 8.0 | Active |

PREPARATION, RESULTS AND COMMENTS

The SMGC, PGMS and lactated monoglycerides were heated on a steam bath until fully molten (145 degrees F.) Potassium sorbate was added and dispersed with hand stirring. Hot water was added and the mixture stirred to achieve a uniform appearance. The final temperature was 140 degrees F. The initial product from the Gaulin homogenizer was recycled. The final product had a milky appearance and solidified on cooling. An emulsion was produced which maintained its stability through several freeze/thaw cycles.

| Ingredients* | Wt. | Ingredients** | Wt. |
|---|---|---|---|
| Test cake mix | 220.7 g | Test cake mix | 220.7 g |
| Emulsifier | 29.2 g | Emulsifier | 14.6 g |
| Water | 124.4 g | Water | 124.4 g |
| Gum | 0.55 g | Gum | 0.55 g |
| | 374.85 g | | 360.25 g |

| Ingredients*** | Wt. | Ingredients**** | Wt. |
|---|---|---|---|
| Test Cake Mix | 220.7 g | Test cake mix | 220.7 g |
| Emulsifier | 7.0 g | Emulsifier | 7.0 g |
| Water | 124.4 g | Water | 139.7 g |
| Gum | 0.55 g | Gum | 0.55 g |
| | 352.65 g | | 367.95 g |
| Comment: Shiny top, chewy texture | | | |

EXAMPLE 10

| | Emulsifier Composition | | | Baked Cake | |
|---|---|---|---|---|---|
| | Weight | | Particle Size (dia- | Cake Batter | Weight Loss During Baking (% mois- | Emulsi- fier Activ- |
| Ingredients | Lbs. | % | microns) | Sp. G. | ture) | ity |
| SMGC | 2.72 | 8.37 | Less than 1 | 0.74* | 9.1 | Fully Active |
| PGMS | 5.18 | 15.94 | | | | |
| Lactated Mono- Glycerides | 5.18 | 15.94 | | 0.89** | 9.1 | Fully Active |
| Potassium Sorbate | 0.21 | 0.65 | | 0.96*** | 10.1 | Par- tially Active |
| Water | 19.20 | 59.10 | | | | |

-continued

| Ingredients | Emulsifier Composition | | | Baked Cake | | |
|---|---|---|---|---|---|---|
| | Weight Lbs. | % | Particle Size (dia-microns) | Cake Batter Sp. G. | Weight Loss During Baking (% moisture) | Emulsifier Activity |
| | 32.49 | 100.00 | | 0.98**** | 10.5 | Partially Active |

PREPARATION, RESULTS AND COMMENTS

The SMGC, PGMS and lactated monoglycerides were heated on a steam bath until fully molten. The temperature was 145 degrees F. Potassium sorbate was added and dispersed with hand stirring. Hot water was added. The mixture was stirred and a uniform appearance was achieved. The final temperature was 140 degrees F. The initial product was recycled through the homogenizer. The final product had a milky appearance and solidified on cooling. A stable emulsion was produced which maintained its stability through several freeze/thaw cycles.

| Ingredients* | Wt. | Ingredients** | Wt. |
|---|---|---|---|
| Test cake mix | 220.7 g | Test cake mix | 220.7 g |
| Emulsifier | 29.2 g | Emulsifier | 14.6 g |
| Water | 124.4 g | Water | 124.4 g |
| Gum | 0.55 g | Gum | 0.55 g |
| | 374.85 g | | 360.25 g |

| Ingredients*** | Wt. | Ingredients**** | Wt. |
|---|---|---|---|
| Test cake mix | 220.7 g | Test cake mix | 220.7 g |
| Emulsifier | 7.0 g | Emulsifier | 7.0 g |
| Water | 124.4 g | Water | 140.6 g |
| Gum | 0.55 g | Gum | 0.55 g |
| | 352.65 g | | 368.85 g |
| Comment: Coarse, chewy texture | | | |

There are several observations which should be noted regarding these test examples. In all examples, a stable emulsion was prepared. Some emulsifiers remained liquid, or at least unsolidified, upon cooling (examples 2, 4, 5, 6, 7), while the other emulsifiers solidified upon cooling. A review of the cakes baked using both unsolidified and solidified emulsifiers indicates that the quality of the baked product is not dependent upon, or even affected by, the physical form of the hydrated emulsifier. The only difference between solid and liquid (jelllike) emulsifiers is the inclusion of gum. The absence of gum produces solid emulsifiers while including the gum produces the semi-solid emulsifiers.

The primary test of the hydrated emulsifier's usefulness is the extent of its activity in the baked cake. In examples 1-7, the hydrated emulsifier comprised 7.80% of the cake batter. In all of these examples, the emulsifier was fully active. That is to say the emulsifier combined with the other ingredients uniformly and completely to produce a cake having a uniform, good texture and high rise.

In examples 8-10, the percentage of emulsifier in the cake batter was varied from about 1.90% (examples 8**, 9, 10**) to about 7.8% (examples 8*, 9*, 10*). In example 8, 9 and 10, the hydrated emulsifier comprised 4.05% of the cake batter and was fully active in the cake. In examples 8*, 9* and 10*, the hydrated emulsifier comprised 1.98% of the batter and was partially active. The terms "partially active" (examples 8*, 8, 9*, 10*, 10) and "active" (example 9**) were used to denote that the texture of the resulting cake was not entirely uniform or good. This usually takes the form of large air spaces, coarse or uneven texture and/or low rise.

Accordingly, based on these test examples and experience, it was concluded that the hydrated emulsifier should comprise about 2% or more of the batter by weight to achieve full activity in the baked cake.

Initially, it was beleived that the hydrated emulsifier would have to be refrigerated or frozen for shipment to commercial bakers. Therefore, many of the test examples were subjected to repeated freeze/thaw cycles to determine their effect on the emulsifier's activity in the baked cake as well as to see if the water would separate out. It was observed that emulsifier activity was not noticeably affected by repeated freeze/thaw cycles. Further, none of the emulsifier's components, particularly the water, separated out after repeated freeze/thaw cycles. In many of the Examples, a preservative, such as potassium sorbate was added to retard spoilage. In addition, a 10% solution of potassium sorbate in water may be sprayed on top of a freshly made container of the hydrated emulsifier to prevent spoilage. This would be especially useful when non-fat dry milk (NFDM) was in the formulation.

Finally, from studies of the baked cakes in conjunction with observations of the test examples, and inferences drawn, it was established that freezing and thawing the hydrated emulsifier repeatedly has no effect on the quality or function of the emulsifier. Even more significant, it was found that the NFDM was not needed to produce an effective hydrated emulsifier. In this regard, it was discovered that if the temperature of the water added to the molten emulsifier components was about the same temperature as the molten emulsifier components in the steam bath, or higher, then the resulting mixture entering the homogenizer was uniform, as was the hydrated emulsifier product. This uniformity of product was achieved regardless of whether NFDM was included in the ingredients or not.

Another observation regarding temperature is that uniformity in the mixture heated over a steam bath was achieved only at temperatures above about 130 degrees F., although the mixture of SMGC, PGMS and lactated monoglycerides will melt at about 110 degrees F.-115 degrees F. A mixture temperature of 140 degrees F. produced good results.

The xanthan gum functions as a sort of starch in the cake batter. The gum dissolves in the water, but forms a suspension in the molten emulsifier components. Gum is not essential to the composition or performance of the hydrated emulsifier. It is included as a component because it improves the baked cake by assimilating water. Also, some commercial users might not otherwise include it in the cake mix ingredients comprising the batter. Therefore, gum is included in the commercial product to insure the uniformity of the batter based baked goods which utilize the emulsifier.

In general, gum holds more water so the cake can have fewer ingredients and fewer calories. Some products, such as so-called "junk foods" are not concerned with calories, so the manufacturers might prefer an embodiment of the hydrated emulsifier which omits gum.

Thus, a hydrated emulsifier has been disclosed which provides a molecular dispersion and achieves the objects set forth.

Naturally, other features and advantages than those disclosed will be readily apparent and appreciated to those skilled in the art as will be various modifications and variations of the preferred embodiments disclosed, as well as their use in other products. For example, for those who may wish to maintain a small amount of fat in the baked product, a shortening, such as Durkee's Code 321, could be included in the hydrated emulsifier with excellent results in the baked product. Some commercial bakers like to maintain some fat in their products to make their products more similar to regular off-the-shelf products. The baked product could then still have fewer calories than a product baked from a batter utilizing a regular emulsifier. An illustrative example of the formulation of a hydrated emulsifier which includes a fat is as follows:

| Ingredient | Weight by Percent |
| --- | --- |
| Stearyl Monoglyceridyl Citrate | 6.52 |
| Propylene Glycol Monostearate | 12.71 |
| Lactated Monoglycerides | 12.71 |
| Xanthan gum | 3.12 |
| Shortening (Durkee's Code 321) | 32.13 |
| Preservative (potassium sorbate) | 0.68 |
| Water | 32.13 |
| | 100.00 |

In addition to utilizing shortening, this embodiment includes less water. The invention is defined by the following claims.

What is claimed is:

1. A hydrated emulsifier for use as a partial or complete replacement for shortening in flour based baked goods comprising in uniform combination:
   stearyl monoglyceridyl citrate in amounts from about 2% to about 8.5% by weight;
   lactated monoglycerides in amounts from about 4% to about 16% by weight;
   propylene glycol monostearate in amounts from about 4% to about 16% by weight;
   water in amounts from about 55% to about 90% by weight.

2. The hydrated emulsifier as set forth in claim 1, wherein:
   the emulsifiers are present as a homogenized dispersion.

3. The hydrated emulsifier as set forth in claim 2, wherein:
   the dispersed emulsifiers have particle sizes ranging from about 1 micron to about 2 microns.

4. The hydrated emulsifier as set forth in claim 1, further including:
   a gum in minor amounts.

5. The hydrated emulsifier as set forth in claim 4, wherein:
   the gum comprises xanthan gum.

6. The hydrated emulsifier as set forth in claim 4, wherein:
   the gum comprises from about 1.75% to about about 2% by weight.

7. A hydrated emulsifier for use as a partial or complete replacement for shortening in flour based baked goods comprising a homogenized mixture of:
   stearyl monoglyceridyl citrate in amounts from about 3% to about 5% by weight;
   lactated monoglycerides in amounts from about about 6% to about 8% by weight;
   propylene glycol monostearate in amounts from about 6% to about 8% by weight; and
   water in amounts from about 75% to about 80% by weight.

8. The hydrated emulsifier as set forth in claim 7, further including:
   a gum comprising from about 1.75% to about 2% by weight.

9. A process for making a hydrated emulsifier for use as a partial or complete replacement for shortening in flour based baked goods comprising the steps:
   (1) melting and combining stearyl monoglyceridyl citrate, in amounts from about 2% to about 8.5%, propylene glycol monostearate, in amounts from about 4% to about 16%, and lactated monoglycerides, in amounts from about 4% to about 16%, all percentages by weights;
   (2) adding water, in amounts from about 55% to about 90% by weight, to the combined melted components in step 1, said water being at a temperature which is substantially the same or greater than the temperature of the melted components;
   (3) mixing the emulsifiers and water to form an aqueous dispersion;
   (4) cooling the aqueous dispersion.

10. The process as set forth in claim 9, wherein:
    the temperature of the water in step 2 is greater than about 130 degrees F.

11. The process as set forth in claim 9, further including the step:
    homogenizing the aqueous dispersion.

* * * * *